United States Patent [19]

Williams

[11] 4,360,163
[45] Nov. 23, 1982

[54] ELECTROMAGNETIC DIESEL FUEL INJECTOR

[75] Inventor: Donald L. Williams, Port Clinton, Ohio

[73] Assignee: General Motors Corporation, Detroit, Mich.

[21] Appl. No.: 226,160

[22] Filed: Jan. 19, 1981

[51] Int. Cl.³ .......................................... F02M 59/00
[52] U.S. Cl. .......................... 239/533.5; 137/625.65
[58] Field of Search ................. 239/95, 533.2, 533.5, 239/533.9, 124–125, 585; 137/625.65, 625.68

[56] References Cited

U.S. PATENT DOCUMENTS 2,964,023 12/1960 Meulendyk .................... 137/625.68
3,902,524 9/1975 Stoltman ....................... 137/625.68
4,182,492 1/1980 Albert et al. ........................... 239/95
4,247,044 1/1981 Smith .................................... 239/585

Primary Examiner—Andres Kashnikow
Assistant Examiner—Paul A. Sobel
Attorney, Agent, or Firm—Arthur N. Krein

[57] ABSTRACT

An electromagnetic diesel fuel injector of the type that is continuously supplied with pressurized fuel and having a pressure actuated injection nozzle at one end thereof is provided with a solenoid actuated spool valve means that is operative to selectively effect communication of the injection nozzle either with the pressurized fuel when the solenoid is energized or to a low pressure fuel drain conduit means when the solenoid is de-energized.

3 Claims, 3 Drawing Figures

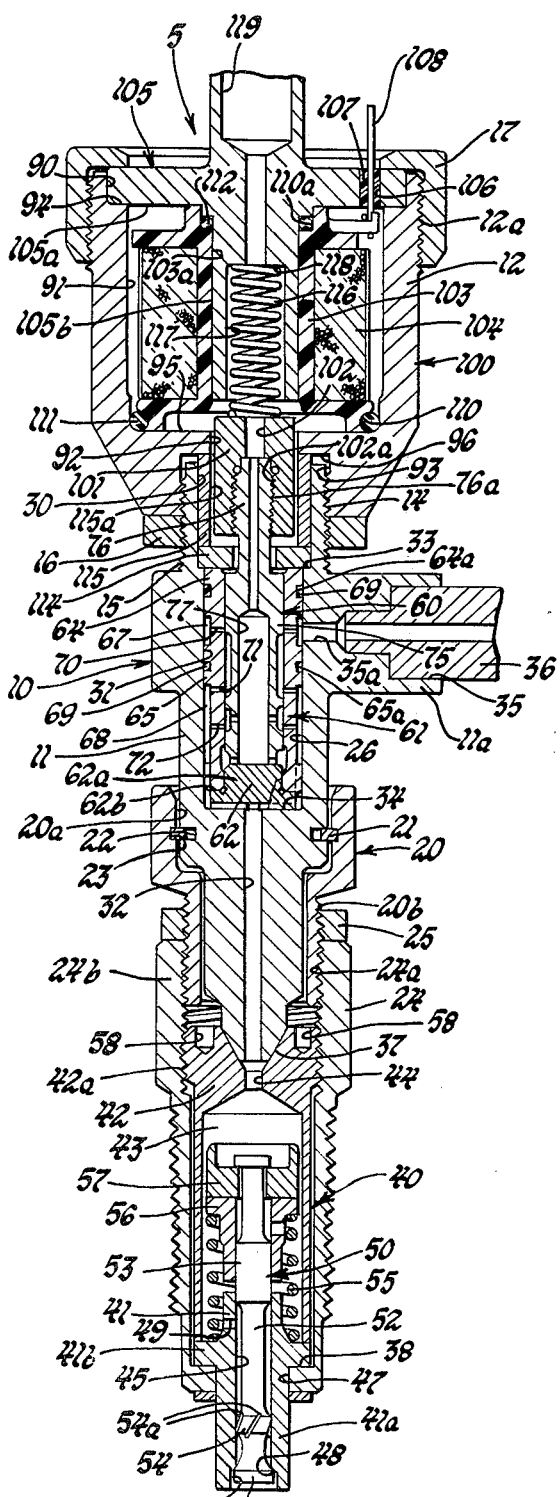

ELECTROMAGNETIC DIESEL FUEL INJECTOR

TECHNICAL FIELD

This invention relates to fuel injection apparatus, and, in particular, to an electromagnetic fuel injector for use in an internal combustion engine, particularly a diesel engine.

DESCRIPTION OF PRIOR ART

Fuel injection nozzles, for example, of the poppet valve type have been used for the direct injection of fuel into the cylinders of an internal combustion engine, such as a diesel engine. In such prior art poppet type fuel injection nozzle, the closure member of the valve is normally moved to its open position by the supply of pressurized fuel to be injected acting on the head of the valve and, the closure member thereof is normally moved to its closed position by a return spring, operating, for example, on a shoulder of the valve at the inner end of the stem thereof when the fuel pressure is reduced after some predetermined period of injection.

For effective operation of such fuel injection nozzles of the above-described type in multiple cylinder engines, the individual fuel injection nozzles must be sequentially supplied with pressurized fuel, from an injection pump, in order to effect injection. Since this type fuel injection nozzle is pressure operated, the means used to control such functions as injection timing and injection flow quantities must be incorporated into the associate injection pump.

Such conventional fuel injection nozzles and injection pump assemblies have a number of objectionable operating characteristics, such as, for example, variation in flow stability during injection among the various nozzles, and a rapid supply pressure drop through the fuel system from the injection pump to the injector nozzle and through the nozzle components of the injector assembly itself.

In an attempt to improve on such conventional type fuel injection nozzles, various forms of electromagnetic devices have been incorporated into this type of fuel injection nozzle in an effort to correct one or more of the above-described problems associated with this type of fuel injection nozzle.

SUMMARY OF THE INVENTION

The present invention provides an electromagnetic diesel fuel injector that includes a solenoid actuated, spool valve assembly which is operative to control the opening and closing of a pressure actuated fuel injection nozzle by controlling the flow interconnection of this injection nozzle to either a source of pressurized fuel or to a source of low pressure fuel.

It is, therefore, a primary object of this invention to provide an improved electromagnetic fuel injector for use on a diesel engine, wherein movement of the pressure actuated injection valve thereof to its open position is controlled by a solenoid actuated spool valve controlling flow of pressurized fuel thereto.

Another object of this invention is to provide an improved electromagnetic fuel injector having an injector nozzle assembly of the pressure actuated type incorporated therein and a hydrostatically balanced, solenoid actuated spool valve being used to control the flow of pressurized fuel to the injector nozzle.

A still further object of this invention is to provide an electromagnetic fuel injector for use in a diesel engine, wherein injection timing and the rate of injection from the injector is controlled by a solenoid actuated spool valve, the solenoid having an extremely rapid response time and being operable on relatively modest electrical power input.

Still a further object of this invention is to provide an improved electromagnetic fuel injector for use in a diesel engine, the injector including a solenoid actuated spool valve to hydraulically control opening and closing movement of a poppet type injection nozzle incorporated into the fuel injector assembly.

For a better understanding of the invention, as well as other objects and further features thereof, reference is had to the following detailed description of the invention to be read in connection with the accompanying drawings.

DESCRIPTION OF THE DRAWINGS

FIG. 1 is a longitudinal sectional view of an electromagnetic fuel injection constructed in accordance with the invention, with the poppet valve of the injection nozzle thereof shown in elevation;

FIG. 2 is an enlarged sectional view of the spool valve assembly, per se, of the electromagnetic fuel injector of FIG. 1; and, FIG. 3 is an enlarged sectional view of the spool valve and valve sleeve of the spool valve assembly of FIG. 2 taken along line 3—3 of FIG. 2.

DESCRIPTION OF A PREFERRED EMBODIMENT

Referring now to FIG. 1 of the drawings, there is illustrated a preferred embodiment of an electromagnetic fuel injector 5, in accordance with the invention, that includes an elongated housing means 10 provided by a tubular housing 11, with a hollow, cup-shaped, solenoid body 12 and a solenoid clamp ring nut 17 extending from one end thereof, and a nozzle clamp nut 20 and a nozzle sleeve nut 24 extending from the other end of the housing 11.

In the construction illustrated, the solenoid body 12 is suitably secured to housing 11 as by having its lower end, with reference to FIG. 1, in threaded engagement as at 14 with the externally threaded upper end 15 of housing 11, with a lock nut 16 also being threaded on the housing 11 in locking engagement with the solenoid body 12. As shown, the solenoid clamp ring nut 17 is threaded on the externally threaded upper end 12a of the solenoid body 12. The nozzle clamp nut 20 having a stepped bore therethrough, is telescopically received over the stepped lower end of housing 11 and is fixed thereto, as by a snap ring 21 which is positioned in annular grooves 22 and 23 provided for this purpose on the exterior of the housing 11 and in the interior head portion 20a of the nozzle clamp nut 20. The nozzle sleeve nut 24 is threaded onto the lower externally threaded end 20b of the clamp nut 20. Preferably, a lock nut 25 is threaded onto the nozzle clamp nut 20 in position to effect locking engagement with the nozzle sleeve nut 24.

In the embodiment illustrated, the nozzle sleeve 24 is provided with a reduced diameter threaded shank 24a that depends from the head 24b of this nozzle sleeve whereby the subject injector 5 can be threadedly secured in a suitably complementary shaped bore in the cylinder head, not shown, of an engine, also not shown.

Housing 11 is also provided with an axial stepped bore 26 extending therethrough. Bore 26 defines, in succession starting from the top with reference to FIG. 1, an internal cylindrical upper wall 30, a cylindrical intermediate wall 31 and a cylindrical lower wall 32 which defines a fuel passage. Walls 31 and 32 are of progressively reduced internal diameters compared to the internal diameter of upper wall 30. Walls 30 and 31 are interconnected by a flat shoulder 33. Walls 31 and 32 are interconnected by a flat shoulder 34.

In addition, the housing 11 is provided with a stepped radial bore 35 that extends through the radial flange 11a of the housing 11 so as to open at a predetermined axial position through the intermediate wall 31 whereby to define an inlet port 35a opening into the cavity defined by this intermediate wall 31. As shown, bore 35 is adapted to be connected in fluid communication with a suitable pressurized fuel supply conduit, such as pipe 36, which in the construction illustrated, is secured, as by brazing, to the outboard internal cylindrical wall defined by bore 35 in the radial flange 11a of the housing.

Between the lower frusto-conical end 37 of the housing 11 and the internal flange 38 of nozzle sleeve 24 there is positioned a conventional, pressure operated, fuel injection nozzle, generally designated 40, that has its inlet in flow communication with the passage defined by lower wall 32 in the housing 11.

In the construction illustrated, the fuel injection nozzle 40 is of the outward opening poppet valve type and includes a nozzle body 41 and an upper shell 42 coupled together in a manner to be described, so as to define an internal cavity 43. As shown, the upper shell 42 is provided with a suitable axial extending fuel passage 44 opening into the cavity 43. Nozzle body 41 is provided with an axial bore 45 that extends from the upper portion of the nozzle body to open into an enlarged cavity 46 at the reduced diameter, outboard end 41a of the nozzle body 41. This outboard end 41a of the nozzle body 41 is of reduced diameter and sized to extend through the aperture 47 in the lower end of the nozzle sleeve 24 whereby to, in effect, define a spray tip end of the injector. An annular conical valve seat 48 is provided between the bore 45 and the cavity 46. In addition, the nozzle body 41 is also provided with one or more radial ports 49 effecting fluid communication between the bore 45 and the cavity 43.

The closure member of this injection nozzle 40 includes a poppet valve 50 having a head 51 adapted to move relative to the valve seat 48 and a stem 52 extending upward from the head. Valve stem 52 is provided with axial spaced apart lands 53 and 54 that are slidably and guidingly received in the bore 45. As shown, land 54 is provided with helical grooves 54a on its peripheral surface. The head 51 of valve 50 is normally biased into seating engagement with valve seat 48 by means of a spring 55, of predetermined force, acting on the enlarged free end of the valve stem 52 via a sleeve 56 and collar 57, the latter being suitably fixed against axial movement in one direction relative to the valve as by being in abutment against an enlarged portion of stem 52 at the free end thereof.

In the embodiment illustrated, the upper shell 42 is provided at its upper end with external threads 42a for threaded engagement with the internal threads 24a of the nozzle sleeve 24. Suitable wrench receiving means, such as spanner wrench receiving apertures 58 are provided in the upper shell 42 whereby it can be manually torqued downward, with reference to FIG. 1, during assembly so as to axially position it within the nozzle sleeve 24 whereby the annular radial flange 41b of the nozzle body 41 is sandwiched between the lower end surface of the upper shell 42 and the internal flange shoulder 38 of the nozzle sleeve 24.

After assembly of the fuel injection nozzle 40 in the nozzle sleeve 24, the nozzle sleeve 24 is then threaded onto the threads 20b of the nozzle clamp nut 20 so that the conical portion of the bore defining the fuel passage 44 in the upper shell 42 is held in pressure sealed relationship with the conical end 37 of housing 11.

To control flow between the inlet port 35a and the fuel injection nozzle 40, and to control flow between this nozzle 40 and a drain port to be described hereinafter, there is provided a spool type valve assembly that includes a spool valve 60 operable in a valve sleeve 61 that is closed at one end by a shoulder plug 62.

In the construction illustrated, valve sleeve 61 is of cylindrical, tubular configuration with a bore 63 extending axially therethrough. However, the lower end of the valve sleeve 61 is then enclosed by means of the shoulder plug 62 which has its reduced diameter portion 62a thereof secured, as by a press fit, into the lower end of the bore 63, with reference to FIG. 1, with the shoulder 62b of this plug then abutting against the lower end surface of the valve sleeve 61. For a purpose which will become apparent hereinafter, the outside diameter of the shoulder portion of the shoulder plug 62 corresponds substantially to the reduced diameter portion of the valve sleeve 61 described hereinafter.

Valve sleeve 61 is provided with axial spaced apart lands 64, 65 and 66 of suitable outside diameter whereby this valve sleeve 61 is positioned in the housing 11 with these lands slidably and sealingly received by the internal wall 31 of the housing 11. The reduced external diameter portions of the valve sleeve 61 between lands 64 and 65 and between lands 65 and 66 define, with the intermediate wall 31 of housing 11, annular fuel chambers 67 and 68, respectively, see FIG. 1.

As shown, fuel chamber 67 is axially positioned so as to be in fluid communication with the inlet port 35a in housing 11. Fuel chamber 68, on the other hand, is in fluid communication with the passage defined by the lower wall 32 of the housing by means of axial slots 66a extending through the land 66 and by means of a plurality of radial slots 62c provided in the lower end of the shoulder portion of shoulder plug 62, as best seen in FIGS. 1 and 2.

In addition, the valve sleeve 61 is provided with a set of radial ports 70, which may be referred to as inlet port means, aligned midway between lands 64 and 65 to effect fluid communication between the fuel chamber 67 and the internal cavity defined by the bore 63 in this valve sleeve and, with a second set of radial ports 71 and a third set of radial ports 72, which may be referred to as drain port means, suitably axially positioned in spaced apart relationship to each other between the lands 65 and 66 to effect fluid communication between the cavity defined by bore 63 in the valve sleeve 61 and the fuel chamber 68.

In a particular embodiment and for a purpose to be described, both the set of ports 70 and the set of port 72 were formed so that each of these was of 0.137 to 0.20 millimeter in diameter and, accordingly, in order to effect suitable fluid flow through these ports, each set included forty-five such ports. As best seen in FIG. 3, the ports 70 in the first set of ports are circumferentially equally spaced apart from each other. The ports 72 were also arranged in a similar manner. In this same embodiment, the ports 71 were of substantially larger diameter than that of ports 70 and 72, and, accordingly, only four such ports 71 were used and were located in circumferentially equal spaced apart relationship to each other, only two such ports 71 being shown in either FIG. 1 or 2.

As illustrated in FIG. 1, annular seals, such as O-rings 69, are positioned in suitable annular grooves 64a and 65a provided for this purpose on the lands 64 and 65, respectively, so as to effect sealing between the valve sleeve 61 and the intermediate wall 31 of the housing 11. These seals are thus positioned so as to effect sealing on opposite sides of the fuel chamber 67, since during operation, this chamber will be continuously supplied with pressurized fuel.

The spool valve 60 includes a main valve body 75 and a reduced diameter stem 76, with an axial stepped bore 77 extending through these components. The valve body portion 75 is provided with axial spaced apart lands 80, 81 and 82 of a diameter to slidably and sealingly engage the internal wall defined by the bore 63 in the valve sleeve 61. The reduced diameter portions of the valve body 75 between lands 80 and 81; between lands 81 and 82; and, between land 82 and the lower end of the spool valve body 75 form with the internal wall defined by the bore 63 in the valve sleeve 61, annular fuel chambers 83, 84 and 85, respectively.

As best seen with reference to FIGS. 1 and 2, the axial spacing of the leading edges of the lands 80 and 82 are preselected, relative to the axial spacing of the radial ports 70 and 72, respectively, whereby to control flow through these ports in a manner and for a purpose to be described in detail hereinafter. In addition, the valve body 75 is preferably provided with a plurality of radial ports 86 connecting the fuel chamber 84 to the central flow passage defined by bore 77 and, the lower free end of this valve body 75 is provided with radial slots or passages 87 so as to also interconnect the fuel chamber 85 with the above-identified central flow passage.

Preferably, as shown in FIGS. 1 and 2, the valve sleeve 61 is also provided with an annular internal groove 88 located next adjacent to the shoulder plug 62 whereby, to in effect, enlarge the volume of the fuel chamber 85 so that this fuel chamber in flow communication via the passages 87 with the central flow passage defined by the bore 77 is operative so as to substantially reduce hydraulic stiction between the mating surfaces defined by the lower end surface of the spool valve 60 and the upper end surface of shoulder plug 62.

To effect controlled movement of the spool valve 60 it is operatively connected to an electromagnetic unit or solenoid, generally designated 100, as by having the tubular armature 101 thereof operatively fixed to the spool valve 60. In the construction shown, the internal threaded portion 102a of the axial bore 102 extending through the armature 101 is engaged on the external threads 76a on the stem 76 of the spool valve 60.

The body 12 of the solenoid 100, made of a suitable material, such as silicone core iron, is provided with an axial stepped bore therethrough to provide, starting from the top with reference to FIG. 1, a cylindrical upper wall 90, an intermediate upper wall 91, a lower intermediate wall 92 and a lower wall 93. The walls 91 and 92 are of progressively reduced internal diameters relative to the internal diameter of the upper wall 90, while the internal diameter of lower wall 93, in the construction illustrated, is less than that of wall 91 but greater than that of wall 92. Walls 90 and 91 are interconnected by a flat shoulder 94. Walls 91 and 92 are interconnected by a flat shoulder 95. Walls 92 and 93 are interconnected by a flat shoulder 96.

Solenoid 100 further includes a tubular coil bobbin 103 supporting a wound wire coil 104. Bobbin 103 is positioned in the solenoid body 12 between the shoulder 95 of this body and the lower surface of the flange portion 105a of a circular core 105. The core 105 has an outer cylindrical peripheral edge surface that is slidably received in the cavity provided by the upper wall 90 in the solenoid body 12 for abutment against the shoulder 94 therein. Also as shown, the lower circular portion 105b of core 105 is slidably received in the central bore aperture 103a that extends through coil bobbin 103. Core 105 is retained in the above-described position by means of the solenoid clamp ring nut 17 threaded onto the upper externally threaded end of the solenoid body 12.

The core 105 is also provided with through upright apertures 106 to receive tubular wire guides 107 through which the pair of terminal leads 108 extend, only one such lead being shown in FIG. 1. The opposite end of each of these leads being suitably electrically connected to the terminal ends of the windings of coil 104 in a conventional manner.

As is well known, the terminal leads 108 are provided so that the coil 104 of the solenoid 100 can be connected by electrical control circuit wires, not shown, to a suitable electronic control circuit that is operative to energize and de-energize the solenoid of the electromagnetic fuel injector 5 as a function of engine operation in a desired manner as known in the art.

In the construction illustrated in FIG. 1, the bobbin 103 is provided with annular grooves 110 and 110a at opposite ends thereof to receive O-ring seals 111 and 112. The O-ring seal 111 is used to effect a seal between the solenoid body 12 and the lower end of the bobbin 103, while the O-ring seal 112 is used to effect a seal between the upper end of bobbin 103 and the core 105.

As shown in FIG. 1, the solenoid body 12, as threaded onto the upper end of housing 11, is used to axially retain the lower end surface of the valve sleeve 61 in abutment against the shoulder 34 of housing 11, a C-shaped washer 114 and a cylindrical sleeve 115 being sandwiched, in that order between the upper end surface of the valve sleeve 61 and the flat shoulder 96 of the solenoid body 12.

As will now be apparent to those skilled in the art, the core 105 and the sleeve 115 are also made of a suitable material, such as silicone coil core iron. As illustrated, the axial through bore 115a in sleeve 115 is of a suitable inside diameter relative to the outside diameter of the armature 101 so that this armature is loosely slidable therein.

The armature 101 is thus slidably positioned for movement between a lowered position, the position shown in FIG. 1 with the lower end surface of the spool valve 60 then in abutment against the upper end surface of the shoulder plug 62 and a predetermined raised position, a position in which the armature 101 has moved toward the lower free end of core 105. This raised position of the armature, with reference to the embodiment illustrated, is limited, in effect, by upward movement of the spool valve 60 to a position at which the radial shoulder 78 thereof abuts against the lower surface of the washer 114.

Biasing of the armature 101 to its lowered position and, therefore of the spool valve 61 to its closed position, the position shown in FIG. 1 is effected by means of a coil return spring 116, of a predetermined force. In the construction illustrated, the spring 116 is loosely received in the lower enlarged diameter portion of a stepped bore 117 extending axially through the core 105. The return spring 116 thus abuts at one end against an internal shoulder 118 of the core 105 and at its other end it abuts against the upper surface of the armature 101.

The stepped bore 117 through the core 105 also defines a drain passage or port 119 for the drainage of fuel from the interior of the subject electromagnetic fuel injector 5. As shown in FIG. 1, the outboard end or fitting connector end of the core 105 and therefore of this bore 117 is adapted to be connected in a suitable manner for fluid communication with a suitable drain conduit, not shown, whereby fuel can be returned, for example, to the fuel reservoir, not shown, for the engine.

Operation

The subject electromagnetic fuel injector 5, for example, as assembled on a diesel engine, would be connected by a supply conduit, such as pipe 36, to the discharge outlet of an engine driven high pressure fuel pump, not shown, that is supplied with fuel in a suitable manner from a conventional fuel reservoir, not shown. As used on a diesel engine, the fuel pump, not shown, would be operative whereby to supply fuel to the injector at a suitable high pressure, as desired, typically 1800–2400 psi (12,410–16,547 kPa). Thus during engine operation, the fuel chamber 67 and the radial ports 70 within the injector 5 would be continuously supplied with high pressure fuel via inlet port 35a.

In addition the drain port 118 of the subject injector 5 would be connected to a suitable fuel drain conduit, not shown, whereby fuel can drain from the injector at a preselected, suitable reduced pressure. For example, if such a drain conduit is connected to the fuel reservoir, both not shown, this reduced pressure would correspond to substantially atmospheric pressure. With this arrangement, fuel within the cavity defined by bore 77 in the spool valve 60 of injector 5 will always be at some predetermined low pressure.

During engine operation, when the coil 104 of the solenoid 100 is de-energized, its armature 101 and the spool valve 60 will be in the position shown in FIG. 1, as normally biased to this position by spring 117. In this position of the spool valve 60, its land 80 seals off the inboard ends of the radial ports 70 while at the same time its land 82 is at a position whereat radial ports 72 will be uncovered. With the radial ports 72 uncovered, the fuel in fuel chamber 68 will then be in flow communication via these radial ports 72, fuel chamber 84 and ports 86 with fuel at reduced pressure in the cavity defined by the bore 77 in spool valve 60. In addition, as will now be apparent, fuel chamber 83 is always in flow communication with fuel chamber 68 by means of the radial ports 71.

When the coil 104 of the solenoid 100 is energized, the armature 101 will be moved forward toward the core 105 against the bias force of the return spring 117, thus effecting corresponding movement of the spool valve 60. As the spool valve 60 moves upward, with reference to FIG. 1, within the valve sleeve 61, the land 80 of the spool valve 60 will be moved to a position uncovering the inboard end of the radial ports 70 while the land 82 of this valve moves to a position to close off the inboard end of the radial ports 72.

As the radial ports 70 are uncovered, high pressure fuel from fuel chamber 67 will then flow through the ports 70 into fuel chamber 83. Fuel will then flow from the fuel chamber 83 out through radial ports 71 into fuel chamber 68 and then via the slots 66a and 62a and the fuel passage defined by lower wall 32 in the housing 11 to the fuel injection nozzle 40. The pressurized fuel thus supplied to the fuel injector nozzle 40 is then operative to effect opening of the injector valve 50 so that fuel injection into the associate cylinder of the engine, not shown, will occur. This injection of fuel will continue until the coil 104 is again de-energized.

As the coil 104 of solenoid 100 is deenergized, the return spring 117 is again operative to bias the armature 101 and the spool valve 60 downward, to the position shown in FIG. 1, a position at which land 80 of the spool valve 60 again closes off the inboard end of the radial ports 70 to block the flow of pressurized fuel from fuel chamber 67 to fuel chamber 83. At the same time, the land 82 of the spool valve 60 moves to a position uncovering radial ports 72 so that the pressure of fuel in fuel chamber 68, the passage defined by the bore wall 32 in housing 11 and within the fuel injection nozzle 40 will be reduced by their innerconnection via the radial ports 72, fuel chamber 84 and radial ports 86 with the cavity defined by bore 77 of the spool valve 60. As the above occur, the pressure of fuel in the fuel injection nozzle 40 will be rapidly reduced whereby to permit the spring 55 thereof to return the injection valve 50 to its closed position, the position shown in FIG. 1, to thus terminate fuel injection.

As will now be apparent, the start and end of injection is directly controlled by operation of the solenoid 100 to effect actuation of the spool valve 60, the quantity of fuel discharged from the tip of the fuel injection nozzle 40 being proportional to the pulse duration of energization of the solenoid 100. In addition, since during the time interval between "on" pulses, the injection nozzle 40 is in communication with the low pressure fuel cavity defined by bore 77 in the spool valve 60, the fuel remaining in the injection nozzle will be depressurized, thus precluding any injector leakage or drip between injections.

By making the flow passages or radial ports 70 and 72 in the valve sleeve 61 of suitable small diameters, the axial distance of movement of the spool valve 60 within the valve sleeve 61 in going from the closed to open (off to on) positions relative to these ports can be maintained correspondingly small, thus limiting armature travel correspondingly.

From the construction illustrated, it will now be apparent that the movable spool valve is substantially hydrostatically balanced, that is, the fuel pressure acting on this valve results in no significant axial force on this valve in either direction. With this arrangement the overall size and hence mass of this spool valve 60 can be made relatively small. As a consequence, the solenoid 100 then need only provide sufficient magnetic force to overcome its own spring and additionally to provide the required amount acceleration to the moving armature/spool valve assembly.

The embodiments of the invention in which an exclusive property or privilege is claimed are defined as follows:

1. An electromagnetic fuel injector comprising:

a housing means having an axial stepped bore extending therethrough and having an inlet port opening into said stepped bore intermediate the ends thereof, said inlet port being connectable to a source of pressurized fuel; a pressure actuated injection nozzle operatively connected to one end of said housing means in flow communication with an associated one end of said stepped bore; a cylindrical valve sleeve having a blind bore extending from one end thereof fixed in said stepped bore with the closed end of said valve sleeve located adjacent to said injection nozzle, said valve sleeve having at least a pair of axially spaced apart externally first and second lands thereon with an annular inlet groove therebetween that is positioned for flow communication with said inlet port and, an annular outlet groove extending from said second land to said closed end of said sleeve, said valve sleeve having, in succession starting from said closed end, a drain port means extending from said blind bore to said outlet groove, outlet port means extending from said blind bore to said outlet groove and inlet port means extending from said blind bore to said inlet groove; and, a normally closed solenoid actuated landed spool valve operatively associated with said blind bore of said valve sleeve for movement between a first position blocking flow from said inlet port means to said outlet port means and a second position effecting flow communication between said inlet port means and said outlet port means; said landed valve spool including a drain passage means adapted at one end to communicate with said drain port means when said landed spool valve is in said first position and being connectable at its opposite end to a reservoir for fuel at low pressure.

2. An electromagnetic fuel injector comprising:
a housing means having an axial stepped bore extending therethrough and having an inlet port opening into said stepped bore intermediate the ends thereof said inlet port being connectable to a source of pressurized fuel; a pressure actuated injection nozzle operatively connected to one end of said housing means in flow communication with an associated one end of said stepped bore; a cylindrical valve sleeve having a blind bore extending from one end thereof fixed in said stepped bore with the closed end of said sleeve located adjacent to said injection nozzle, said sleeve having axially spaced apart externally first land, second land and a slotted land thereon with an annular inlet groove between said first and second lands positioned for flow communication with said inlet port and, an annular outlet groove extending from said second land to said closed end of said sleeve and being in flow communication with said injection nozzle sleeve, said valve sleeve having, in succession starting from said closed end, a drain port means of predetermined diameters extending from said blind bore to said outlet groove, outlet port means of predetermined diameters larger than said drain port means extending from said blind bore to said outlet groove and inlet port means of predetermined diameters similar to that of the drain port means, extending from said blind bore to said inlet groove; and, a normally closed, solenoid actuated, landed spool valve operatively associated with said valve sleeve and having a portion thereof positioned in said blind bore for movement between a first position blocking flow from said inlet port means to said outlet port means and effecting flow communication between said drain port means and said outlet port means and a second position effecting flow communication between said inlet port means and said outlet port means while blocking flow through said drain port means; said landed valve spool including a drain passage means adapted to one end to communicate with said drain port means when said landed spool valve is in said first position and being connectable at its opposite end to a reservoir for fuel at low pressure.

3. An electromagnetic fuel injector comprising a housing means having an axial stepped bore extending therethrough and having an inlet port opening at one end into said stepped bore intermediate the ends thereof and being connectable at its opposite end to a source of pressurized fuel; a pressure actuated injection nozzle operatively connected to one end of said housing means, said stepped bore defining a passage means in said housing means that is in flow communication with one end of said injection nozzle, the opposite end of said injection nozzle defining a spray tip that extends outward from said housing means; a cylindrical valve sleeve having a blind bore extending from one end thereof fixed in said stepped bore with the exterior closed end of said sleeve having radial grooves therein and being located adjacent to said passage means, said valve sleeve having axially spaced apart external land means thereon to define an annular inlet groove positioned for flow communication with said inlet port and to define an annular outlet groove in flow communication with said passage means via said radial grooves, said valve sleeve having, in succession starting from said closed end, a drain port means extending from said blind bore to said outlet groove, outlet port means extending from said blind bore to said outlet groove and inlet port means extending from said blind bore to said inlet groove; a normally landed spool valve operatively associated with said valve sleeve and positioned in said blind bore for movement between a first position blocking flow through said inlet port means while permitting flow through said drain port means and a second position permitting flow through said inlet port means while blocking flow through said drain port means; said landed valve spool including a drain passage means adapted to one end to communicate with said drain port means when said landed spool valve is in said first position and being connectable at its opposite end to a reservoir for fuel at low pressure; and, a solenoid means operatively connected to said landed spool valve for effecting movement thereof between said first position and said second position.

* * * * *